(12) United States Patent  (10) Patent No.: US 7,540,423 B2
Harris  (45) Date of Patent: Jun. 2, 2009

(54) METHODS, SYSTEMS, AND COMPUTER PROGRAM PRODUCTS FOR IMPLEMENTING PRESENCE DETECTION USING A SCANNER

(75) Inventor: Richard H. Harris, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 11/462,189

(22) Filed: Aug. 3, 2006

(65) Prior Publication Data

US 2008/0029603 A1    Feb. 7, 2008

(51) Int. Cl.
 *G06K 7/10* (2006.01)
(52) U.S. Cl. ............... 235/462.31; 235/383; 235/385; 235/462.25
(58) Field of Classification Search ............... 235/383, 235/385, 462.25, 462.35, 462.15, 462.31
See application file for complete search history.

(56) References Cited

U.S. PATENT DOCUMENTS

| 4,845,349 | A  | 7/1989  | Cherry             |
| 5,212,370 | A  | 5/1993  | Wittensoldner et al. |
| 5,484,992 | A  | 1/1996  | Wilz et al.        |
| 5,710,416 | A  | 1/1998  | Belknap et al.     |
| 6,236,736 | B1 | 5/2001  | Crabtree et al.    |
| 6,357,659 | B1 | 3/2002  | Kelly et al.       |
| 6,409,086 | B1 | 6/2002  | Pellaumail et al.  |
| 6,863,217 | B2 * | 3/2005  | Hudrick et al. ........ 235/462.14 |
| 7,128,266 | B2 * | 10/2006 | Zhu et al. ............. 235/462.22 |
| 2002/0011519 | A1 | 1/2002 | Shults, III        |
| 2002/0079367 | A1 | 6/2002 | Montani            |
| 2002/0109010 | A1 | 8/2002 | Wilz, Sr. et al.   |

FOREIGN PATENT DOCUMENTS

| JP | 58105378 A | 6/1983 |
| JP | 4151797 A  | 5/1992 |

* cited by examiner

*Primary Examiner*—Seung H Lee
(74) *Attorney, Agent, or Firm*—Cantor Colburn LLP; Jason Piche

(57) ABSTRACT

A method, system, and computer program product for implementing presence detection is provided. The method includes a first mode of a tri-modal application that monitors a field-of-view via a presence detection function of a scanner. The method also includes implementing a second mode of the tri-modal application when a change to the field-of-view is detected and a specified threshold of change is met. The second mode includes activating selected system components of a terminal device, which in turn include a processor and the presence detection function. The second mode also includes fully activating the scanner and monitoring the field-of-view for determining a bar code image. The method further includes initiating a third mode of the tri-modal application when the bar code image is detected at the scanner. The third mode includes activating an illumination component of the scanner, reading the bar code image, and deactivating the illumination component when the bar code image has been read before returning to the second mode.

8 Claims, 2 Drawing Sheets

METHODS, SYSTEMS, AND COMPUTER PROGRAM PRODUCTS FOR IMPLEMENTING PRESENCE DETECTION USING A SCANNER

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to presence detection systems, and particularly to methods, systems, and computer program products for implementing presence detection using a scanner.

2. Description of Background

Many of today's point-of sale terminals, such as kiosks and self-checkout terminals contain presence sensors (for detecting people) and scanners. Scanners are used to communicate product identification to the system while the people presence sensor is used to detect the presence of individuals at or nearby the terminal and use the presence of a person to control various states of the components of the system. The various system components utilized in maintaining such a terminal typically require a great deal of power consumption as they perform continuous and extensive functions. For example, a presence detection component of a terminal device may be required to continuously monitor for presence of individuals. The same terminal device may include other system components that remain active in the event of some activity (e.g., ATM transactions, scanning data for point-of-sale purchases, etc.). These different system components typically utilize a great deal of power, particularly when they are required to maintain an active state over time.

What is needed, therefore, is a more cost efficient way to perform presence detection and scanning processes at a terminal device in a manner that achieves the desired control of a system like lower power consumption than current systems while achieving efficient performance characteristics.

SUMMARY OF THE INVENTION

The shortcomings of the prior art are overcome and additional advantages are provided through the provision of an apparatus and method for implementing presence detection using a combined scanner and presence detector and a tri-modal application. The apparatus is a single bar code scanner that is designed to detect the presence of a person as well as communicate product information via bar code. The method includes a first mode of the tri-modal application that monitors a field-of-view via a presence detection function of a scanner. The method includes implementing a second mode of the tri-modal application when a change to the field-of-view is detected and a specified threshold of change is met. The second mode includes activating selected system components of a terminal device. The selected system components include a processor and the scanner that performs presence detection. The second mode also includes activating the scanner including a bar code reader component at the terminal device and monitoring the field-of-view for determining a bar code image via ambient light provided to the scanner. The method further includes initiating a third mode of the tri-modal application when the bar code image is detected at the scanner. The third mode includes activating an illumination component of the scanner, reading product information, and deactivating the illumination component when the product information has been read before returning to the second mode of the tri-modal application.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which performs presence detection and scanning processes at a terminal device in a manner that achieves a more efficient way of controlling a system to, for example, lower power consumption while achieving efficient performance characteristics. The solution utilizes a tri-modal algorithm that places various system components of the terminal device in a rest, or inactive, state, while monitoring for presence detection. When presence detection occurs, the solution activates designated system components to perform needed functions, and monitors for changes, the occurrence of which cause the tri-modal algorithm to activate/de-activate selected components corresponding to the particular changes detected.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
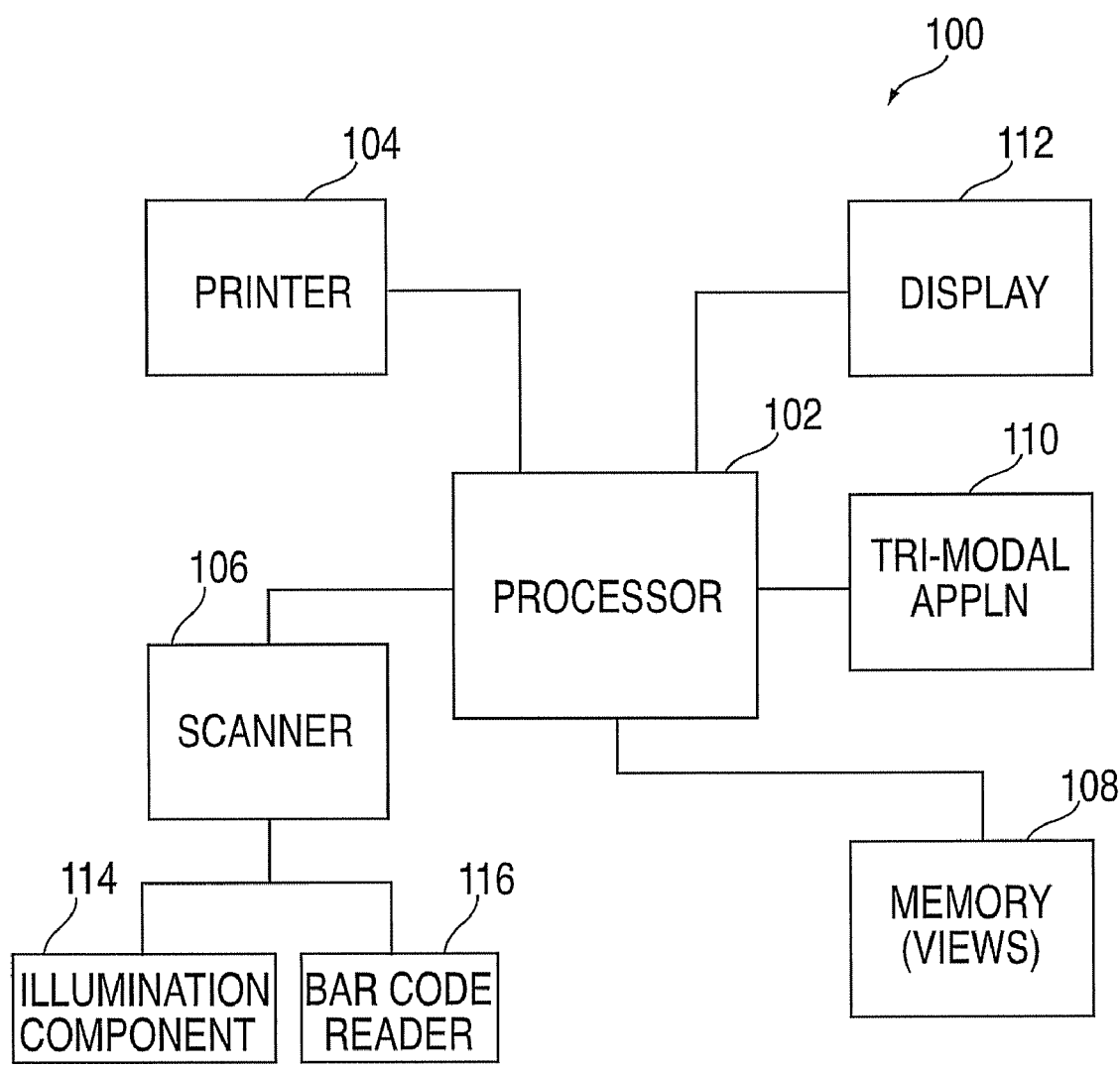
FIG. 1 illustrates one example of a system upon which presence detection activities may be implemented.

Turning now to the drawings in greater detail, it will be seen that in FIG. 1, there is a system for implementing presence detection using a scanning device. The system comprises a terminal device that performs presence detection and scanning processes in a manner that more efficiently achieves lower power consumption than current systems while achieving efficient performance characteristics. The solution utilizes a tri-modal algorithm that places various system components in a rest, or inactive, state, while monitoring for presence detection. When presence detection occurs, the solution activates designated system components to perform needed functions, and monitors for changes, the occurrence of which cause the tri-modal algorithm to activate/de-activate selected components corresponding to the particular changes detected.

The terminal device 100 of FIG. 1 includes a processor 102 in communication with an printer 104, a scanner 106, memory 108, a tri-modal application 110, and a display 112. The processor 102 may comprise a computer processing element that executes logic for handling and coordinating the activities conducted by other system components (e.g., components 104, 112). The type of logic executed by the processor 102 may depend upon the particular functions required of the terminal device 100 (e.g., POS kiosk, ATM, etc.). In addition, the processor 102 executes a tri-modal application 110 for implementing the presence detection activities of the exemplary embodiments as described herein.

Reader 116 may be implemented by an optical sensor for determining presence of an individual at or near the terminal device 100. Reader 116 may utilize technologies, such as electromagnetics, acoustic signaling, light pulses, etc. to determine presence detection. In exemplary embodiments, the scanner 106 utilizes the signals implemented by the reader 116 in determining presence detection (e.g., the same sensor used to detect bar code is used to monitor the field of view near the terminal) and communicates these signals to the processor 102. This feature is described further herein.

Scanner 106 may be implemented as a bar code scanning device (or other suitable data reading device). Scanner 106 is described herein as a bar code scanner; however, it will be understood that other types of data reading devices may be employed. Scanner 106 includes a bar code reader element 116 and an illumination component 114 (e.g., LED illuminator). The bar code sensing function monitors a field-of-view to determine the presence of bar code characteristics. Once detected, bar code information is read by the bar code reader element 116 using the illumination component 114. Presence detection activities that occur via the reader 116 may be facilitated using ambient light when the illumination component 114 is deactivated or by providing short pulses if ambient light is insufficient.

The processor 102 is communication with memory 108 which stores views of images taken and recorded via the tri-modal application 110 executing on the processor 102. These images are evaluated by the tri-modal application 110 as described further in FIG. 2.

Display 112 may be a liquid crystal display device or other suitable apparatus for presenting information to users at the terminal device 102 based upon transactions that occur via the device 102.

As indicated above, the tri-modal algorithm/application places various system components of a terminal device in a rest, or inactive, state, while monitoring for presence detection (e.g., people). When presence detection occurs, the solution activates designated system components to perform needed functions, and monitors for changes, the occurrence of which cause the tri-modal algorithm to activate/de-activate selected components corresponding to the particular changes detected. The tri-modal application utilizes three modes of operation that enable the terminal device 100 to consume minimal power and perform needed functions. For example, the scanner 106 may not become fully activated within the terminal device 100 until a threshold level of change in a field-of-view of the terminal device 100 has been determined. In this manner, the scanner 106 consumes a low quantity of power when it is not needed. In like manner, display 112 and/or printer 104 consume a low quantity of power when their function is not needed.

Figure 2:
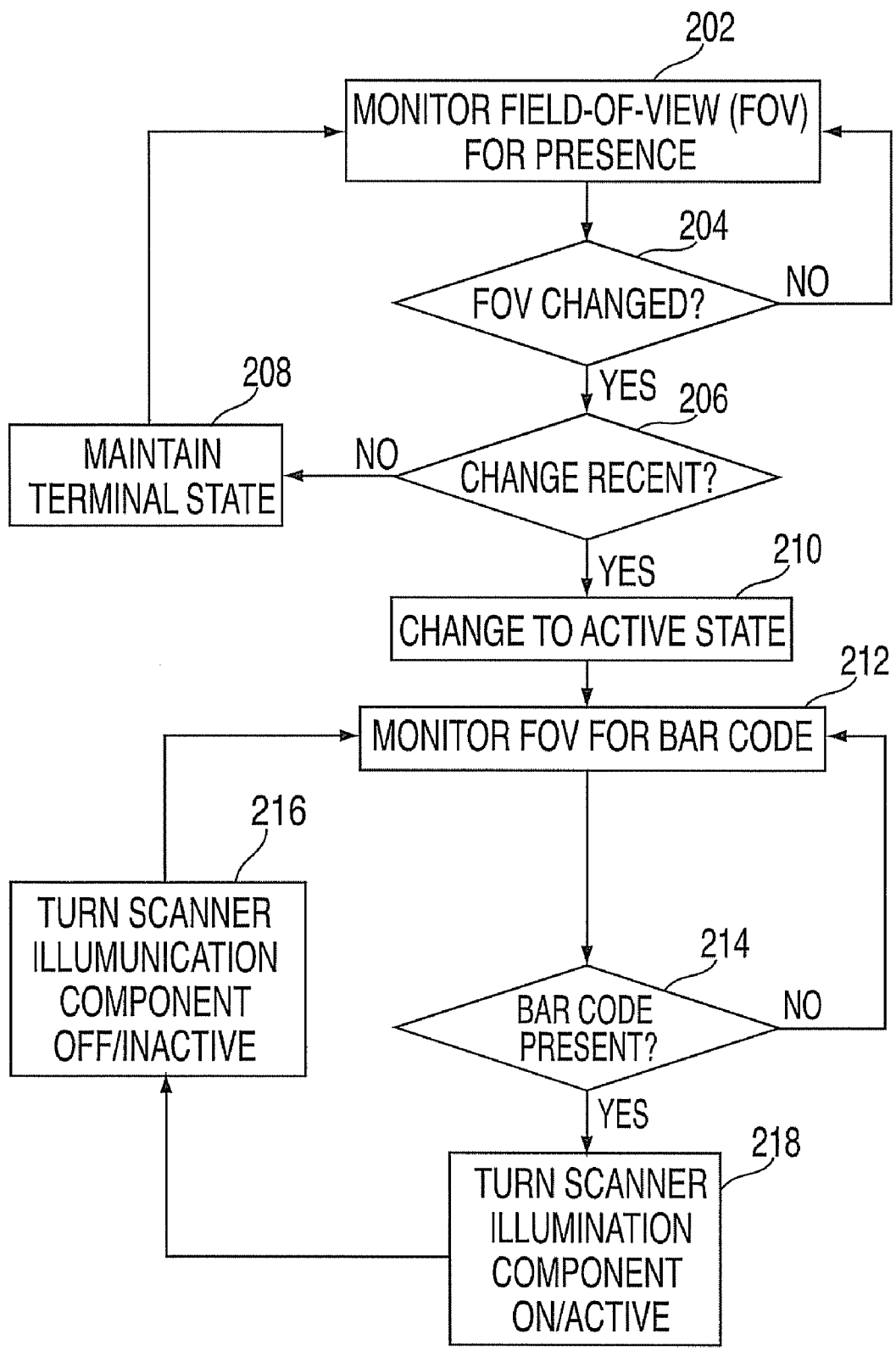
FIG. 2 illustrates one example of a flow diagram describing a process for implementing the presence detection activities.

Turning now to FIG. 2, a process for implementing the presence detection activities will now be described. The first mode of the tri-modal application 110 monitors for presence detection and takes appropriate actions. The only active system components during implementation of the first mode are the processor 102, partially activated scanner 106 and reader 116. The second mode of the tri-modal application 110 is initiated by the first mode when a condition is met. The condition relates to a threshold level of activity (change detection) occurring in response to monitoring the field-of-view. The second mode includes full activation of scanner 106 and selected system components like printer 104 and/or display 112. During the second mode, monitoring for the presence of a bar code occurs via the field-of-view. When a bar code is detected, the third mode of the tri-modal application 110 is initiated. The third mode includes activation of the illumination element 114 of the scanner 106. The third mode monitors for continued presence of one or more bar codes and deactivates the illumination component 114 when no further bar codes are detected. This third mode also results in the ultimate return of the second mode when no bar codes are detected. These processes are described further herein.

The process begins where the system components of the terminal device 100 are placed in a sleep state with the exception of the processor 102 and partial function of scanner 106. A sleep state causes all unneeded system components to be inactive in order to conserve power. The tri-modal application 110 identifies this state and implements the first mode. At step 202, the field-of-view of the terminal device 100 is monitored via a presence detection function of the scanner 106 via the reader 116 in order to determine the presence of an individual at or near the terminal device 100. Presence detection may be implemented by recording images within the field-of-view, storing the images, and comparing a current image to a previously recorded image for any changes. A timing function may also be implemented by the tri-modal application 110, such that these images are time-stamped and used in the comparisons.

At step 204, it is determined whether the field-of-view has changed based upon the comparison. If not, the terminal device 100 remains in sleep mode at step 208 and the first mode of the tri-modal application 110 continues at step 202. Otherwise, the first mode determines whether the change detected is recent at step 206. This may be made by comparing the time stamps taken from the various stored images to see if a threshold time has been exceeded. For example, a time transpiring between two compared field-of-view images that does not meet a specified number of seconds may be considered to be a recent change. If this change is considered to be recent as determined by the comparison, this reflects that a presence has been detected. In this instance, the terminal device 100 including selected system components printer 104 and/or display 112 are awakened from sleep mode and the second mode of the tri-modal application 110 is initiated at step 210.

The initiation of the second mode, and awakening of the terminal device 100, includes fully activating the scanner component 106 including a bar code sensing function of the reader 116 and selected system components printer 104 and/or display 112. This is in anticipation of a transaction by an individual detected nearby the terminal device 100. The field-of-view is monitored by the second mode for detection of bar code characteristics via the field-of-view at step 212. At step 214, it is determined whether bar code characteristics are detected. If not, the second mode continues at step 212. Otherwise, the third mode of the tri-modal application 110 is activated. The third mode includes activating the illumination component 114 of the scanner 106 so that the bar code may be easily read at step 216. At step 218, the illumination component 114 is deactivated by the third mode once the bar code has been read. The process then returns to step 212, whereby the second mode resumes and the field-of-view is monitored for any additional bar codes.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing presence detection using a scanner via a tri-modal application, comprising:
    implementing a first mode of the tri-modal application, comprising:
        monitoring a field-of-view via a presence detection function of a scanner;
    implementing a second mode of the tri-modal application when a change to the field-of-view is detected and a specified threshold of change is met, the second mode comprising:
        activating selected system components of a terminal device, the selected system components including a processor and the presence detection function, the presence detection function determining the presence of an individual at the terminal device and communicating the presence to the processor; and
        activating a bar code sensing function of the scanner; and
        monitoring the field-of-view for determining bar code characteristics via ambient light provided to the scanner; and
    initiating a third mode of the tri-modal application when the bar code characteristics are detected at the scanner, the third mode comprising:
        activating an illumination component of the scanner;
        reading a bar code image;
        deactivating the illumination component when the bar code image has been read; and
        returning to the second mode of the tri-modal application.

2. The method of claim 1, further comprising maintaining operation of the first mode when at least one of:
    a change to the field-of-view is not detected in response to the monitoring; and
    a change to the field-of-view is detected in response to the monitoring and the specified threshold of change is not met.

3. The method of claim 2, wherein the monitoring a field-of-view via the presence detection function of the scanner includes:
    recording image segments of the field-of-view into memory at the terminal device; and
    comparing the image segments to detect changes in the field-of-view.

4. The method of claim 3, wherein the specified threshold is measured by time transpiring between the image segments in which a change has been detected.

5. A terminal device for implementing presence detection using a scanner, comprising:
    a processor; and
    a tri-modal application executing on the processor, the tri-modal application implementing a method, comprising:
        implementing a first mode of the tri-modal application, comprising:
            monitoring a field-of-view via a presence detection function of a scanner;
        implementing a second mode of the tri-modal application when a change to the field-of-view is detected and a specified threshold of change is met, the second mode comprising:
            activating selected system components of a terminal device, the selected system components including the processor and the presence detection function, the presence detection function determining the presence of an individual at the terminal device and communicating the presence to the processor; and
            activating a bar code sensing function of the scanner; and
            monitoring the field-of-view for determining bar code characteristics via ambient light provided to the scanner; and
        initiating a third mode of the tri-modal application when the bar code characteristics are detected at the scanner, the third mode comprising:
            activating an illumination component of the scanner;
            reading a bar code image;
            deactivating the illumination component when the bar code image has been read; and
            returning to the second mode of the tri-modal application.

6. The system of claim 5, wherein the tri-modal application further implements:
    maintaining operation of the first mode when at least one of:
        a change to the field-of-view is not detected in response to the monitoring; and
        a change to the field-of-view is detected in response to the monitoring and the specified threshold of change is not met.

7. The system of claim 6, wherein the monitoring a field-of-view via the presence detection function of the scanner includes:
    recording image segments of the field-of-view into memory at the terminal device; and
    comparing the image segments to detect changes in the field-of-view.

8. The system of claim 7, wherein the specified threshold is measured by time transpiring between the image segments in which a change has been detected.

* * * * *